(12) United States Patent
Welsch

(10) Patent No.: US 7,717,407 B2
(45) Date of Patent: May 18, 2010

(54) SLEEVE ASSEMBLY FOR AN ELASTOMER BEARING

(75) Inventor: Klaus Welsch, Breckerfeld (DE)

(73) Assignee: Huhoco Metalloberflachenveredelung GmbH, Wuppertal (DE)

( * ) Notice: Subject to any disclaimer, the term of this patent is extended or adjusted under 35 U.S.C. 154(b) by 274 days.

(21) Appl. No.: 11/349,708

(22) Filed: Feb. 8, 2006

(65) Prior Publication Data

US 2007/0023985 A1 Feb. 1, 2007

(30) Foreign Application Priority Data

Jul. 27, 2005 (DE) .................. 20 2005 011 722 U

(51) Int. Cl.
*F16F 13/00* (2006.01)
(52) U.S. Cl. .............. 267/140.12; 267/141.1; 267/141.2; 267/153; 280/124.13; 403/225
(58) Field of Classification Search ........... 267/140.12, 267/141.1, 141.2, 141.6, 136, 153; 188/378; 403/221, 225, 365; 280/124.13, 124.177
See application file for complete search history.

(56) References Cited

U.S. PATENT DOCUMENTS

| 2,621,923 | A | * | 12/1952 | Krotz | ............... | 267/281 |
|---|---|---|---|---|---|---|
| 3,235,941 | A | * | 2/1966 | Krotz | ............... | 29/898.04 |
| 4,593,889 | A | | 6/1986 | Odobasic | | |
| 4,922,836 | A | * | 5/1990 | Damico | ............... | 108/146 |
| 5,413,374 | A | * | 5/1995 | Pierce | ............. | 280/124.177 |
| 6,241,062 | B1 | * | 6/2001 | Enright | ............... | 188/378 |
| 6,480,363 | B1 | * | 11/2002 | Prater | ............... | 360/265.7 |
| 6,997,614 | B2 | * | 2/2006 | Kammel et al. | ........... | 384/222 |

FOREIGN PATENT DOCUMENTS

| BE | 039653 | 11/1963 |
|---|---|---|
| DE | 1 105 154 | 4/1961 |
| GB | 492005 | 9/1938 |

* cited by examiner

*Primary Examiner*—Robert A Siconolfi
*Assistant Examiner*—Mariano Sy
(74) *Attorney, Agent, or Firm*—Brinks Hofer Gilson & Lione

(57) ABSTRACT

The invention relates to a sleeve, in particular an outer sleeve assembly for an elastomer bearing (3), with a first, outer sleeve part (1) forming a slit (S1) being arranged coaxially with a second, inner sleeve part (2), which likewise comprises a slit (S2). The outer sleeve part (1) is, on its inner peripheral surface (I1), and the inner sleeve part (2) is, on its outer peripheral surface (O2), provided with a bonding-agent layer (HS1, HS2). The slits (S1, S2) of the sleeve parts (1, 2) are staggered in relation to one another.

16 Claims, 4 Drawing Sheets

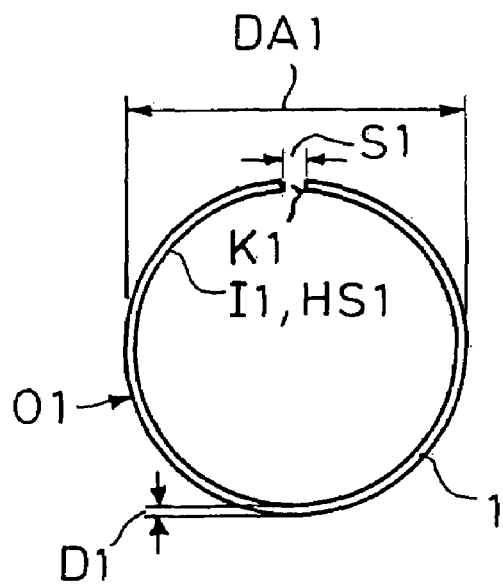
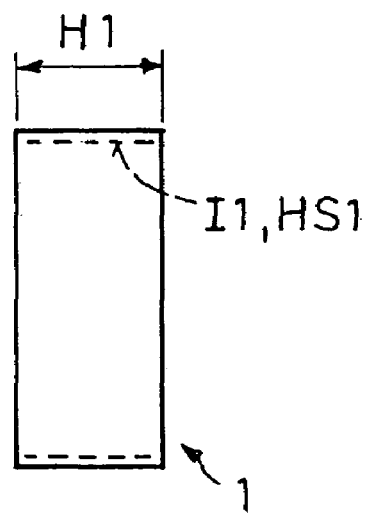
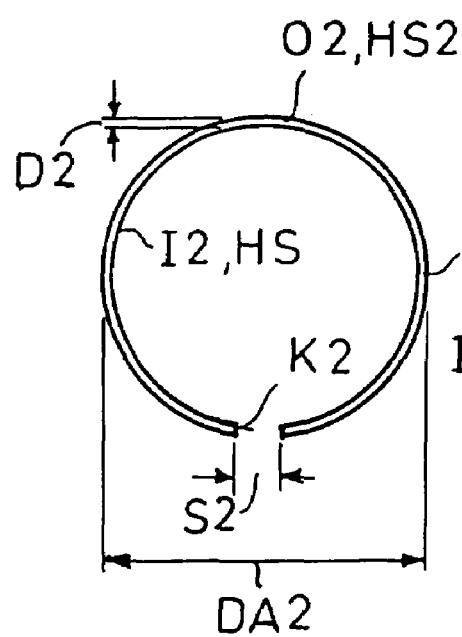
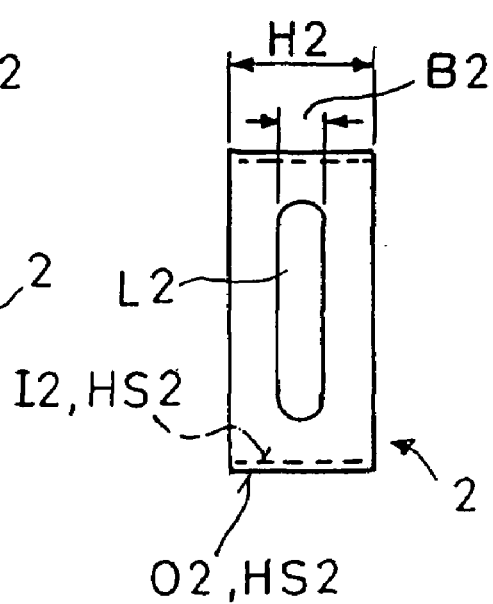

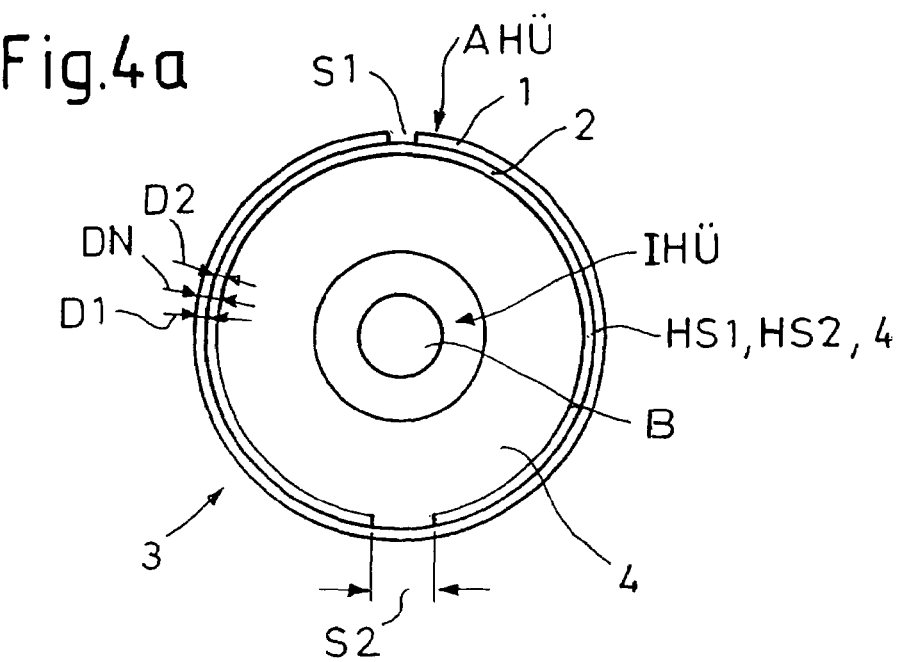
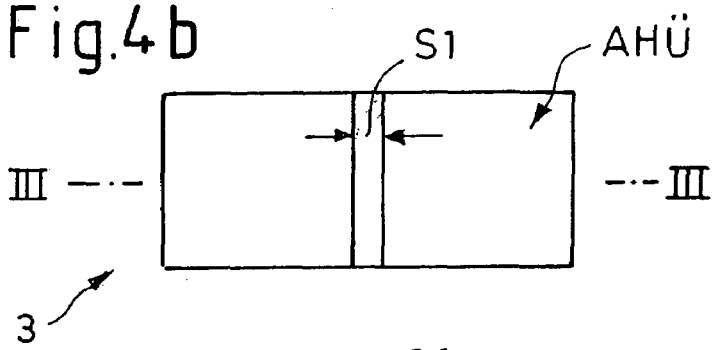
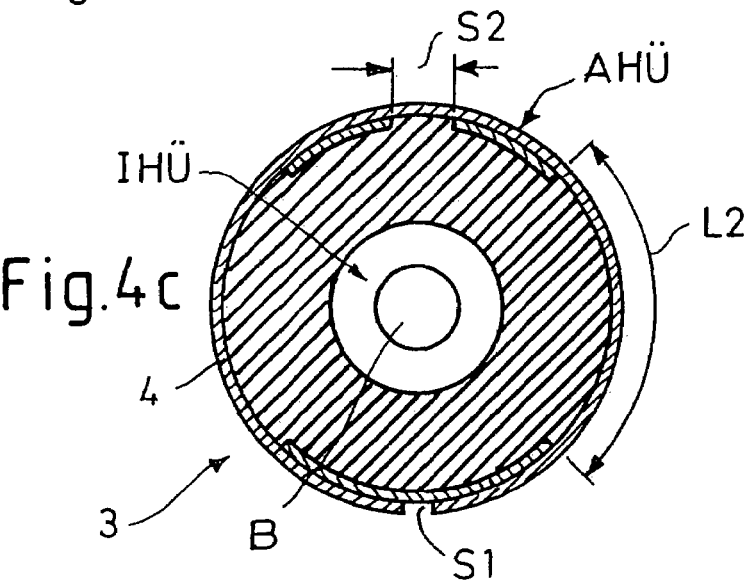

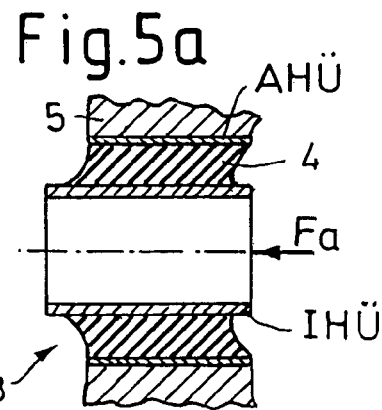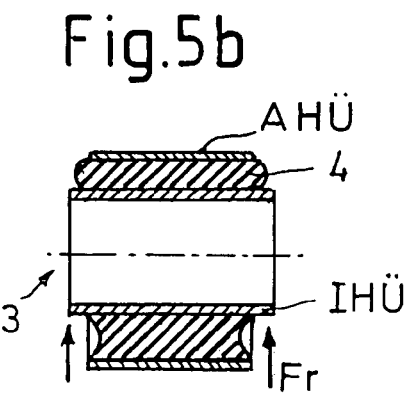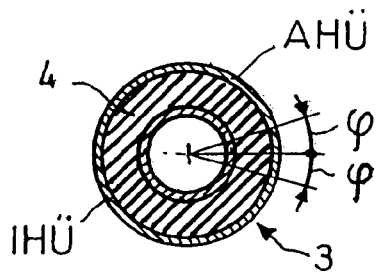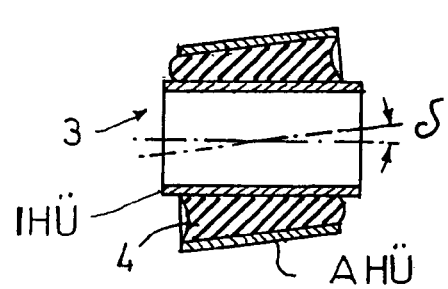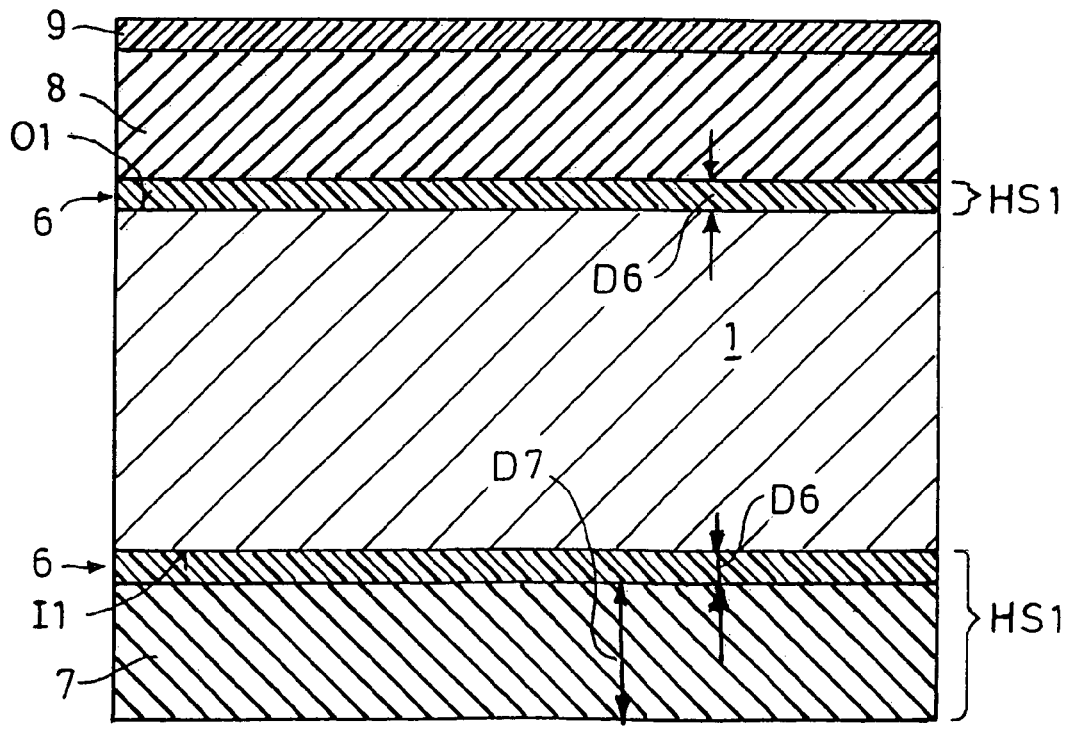

SLEEVE ASSEMBLY FOR AN ELASTOMER BEARING

FIELD OF THE INVENTION

The present invention relates to a sleeve assembly, in particular an outer sleeve for an elastomer bearing. Furthermore, the invention relates to an elastomer bearing with such an outer sleeve.

BACKGROUND AND SUMMARY OF THE INVENTION

Elastomer bearings are mechanical elements in which an inner sleeve and an outer sleeve are interconnected adherently by a vulcanized elastomer or rubber layer. These components typically have a cylindrical shape. For adjusting certain mechanical properties, in particular the compliance between the sleeves, the elastomer layer can additionally be provided with intermediate metal sheets or intermediate sleeves.

Cylindrical elastomer bearings serve for damping radial and axial movements, taking up in particular movements which have a twisting effect and cardioid deflections. For this purpose, they are fastened to an associated receiver, for example a bushing, with a force fit or press fit. In this connection, the fit of the elastomer bearing in the receiver is an important quality criterion, this feature being inspected by the pressing-out forces from the receiver being regularly checked under defined conditions and compared with establishing parameters.

For the production of elastomer bearing outer sleeves, use was generally made of tube sections cut off from commercially available precision tube stock. Such tube sections provide the sleeves with great strength and for this reason continue to be used in many cases.

For bearing production, the elastomer is introduced in hot, liquid form into an annular space enclosed by the inner and outer sleeves and vulcanized there. In this connection, owing to material characteristics, the elastomer layer contracts during cooling after vulcanization and removal from the mold. In order to reduce these contraction stresses, the components are calibrated as finished parts. That is to say the outside diameter of the outer sleeve may be reduced, in some cases by several millimeters. This additional operation constitutes a considerable disadvantage, in particular in the case of the tube sections described.

A known development of the sleeves formed from tube sections consists of what are known as "clinched sleeves", in the case of which it is possible to make the cylindrical sleeve part as a stamping from a plane metal panel, such as a metal sheet. The stamping is bent in a ring shape, so that a ring with a lateral surface which is divided by a slit is produced. The slit is then closed by a positive connection, described as a clinch connection, of the free ends of the stamping. For this purpose, the free ends of the stamping do not have straight edges but complementarily contoured edges, the complementary edge contours engaging in one another to form the connection.

Clinched sleeves are more cost-effective to produce than sleeves consisting of tube sections but have the disadvantage that the strength is markedly lower due to the clinch connection. A further disadvantage is that the connection can be made only partially tight. This is caused in particular by the rubber as a rule being injected in a highly liquid state under high pressure. This in turn results in the rubber as a liquid being able to penetrate through the gaps of the clinch connection, escaping to the outside and solidifying on the outer wall of the sleeve. Consequently, additional cleaning work disadvantageously arises.

Another known development in relation to the sleeves formed from tube sections consists of what are known as slit sleeves. In the case of these sleeves as well, it is possible to produce the cylindrical sleeve part as a stamping from a plane metal panel and then to bend it into a ring. In this case, the slit present in the lateral surface is not closed, the slit sleeves have a defined opening dimension between the free ends of the punching. For assembly, the sleeves are pressed together into a block and inserted into the receiver. As the contraction stresses of the elastomer are then reduced, the elastomer bearing has a firm fit in the support.

Both clinched and slit sleeves belong to the production range of the applicant and are produced from bonding-agent-coated strip.

The object of the present invention is to provide a sleeve, in particular an outer sleeve assembly for an elastomer bearing of the kind referred to in the introduction, which, with high functionality, is characterized by reduced production cost. A further object of the invention consists in providing a corresponding elastomer bearing.

The objects of the invention are achieved for a sleeve of the kind referred to above by virtue of the fact that the sleeve part forms a first, outer sleeve part and is arranged coaxially with a second, inner sleeve part, which both form a slit. The outer sleeve part being, on its inner peripheral surface, and the inner sleeve part being, on its inner peripheral surface and on its outer peripheral surface, provided with a bonding-agent layer, and the slits of the sleeve parts being staggered in relation to one another.

In the outer sleeve assembly according to the invention, neither the inner nor the outer sleeve part is clinched, that is positively connected, but the connection only takes place, specifically by material connection, during the vulcanization of the elastomer, the bonding-agent layers provided according to the invention ensuring the formation of this connection. In this way, an elastomer bearing according to the invention is produced.

It is then also advantageously possible for the connection to be made in a process by the user, and it is realized by the liquid elastomer mixture, in particular rubber mixture, being able to flow between the inner peripheral surface of the outer sleeve part and the outer peripheral surface of the inner sleeve part and in each case to become connected to the bonding agent. Edges which delimit the slits in the outer sleeve part and/or in the inner sleeve part can therefore advantageously be of rectilinear design (i.e. straight cut parallel to the longitudinal axis of the bearing) as they are not intended for forming a connection.

In the production of the material connection between the sleeve parts, provision can advantageously be made, to favor passage of the free-flowing elastomer mixture, that the inner sleeve part comprises openings, in particular at least one slot, preferably two or more slots, extending to the periphery.

The elastomer bearing according to the invention achieves the properties of a tube section with regard to tightness and stability. In this connection, the simpler and therefore more cost-effective production and the novel constructional characteristics described, which also afford opportunities for further structural or assembly-related design possibilities, are advantageous. Calibration of the component elastic stiffness can preferably be dispensed with before the assembly or before the installation of an elastomer bearing according to the invention. In this connection, the sleeve parts are interconnected stably and provide high pressing-out forces.

Defined widths of the slits, which can be provided for the sleeve parts, result in an elastomer bearing according to the invention which, as in the case of use of a slit bushing, has a flexibility which becomes effective advantageously, contraction stresses in the elastomer layer being minimized.

An additional increase in the pressing-out forces can also be achieved, and not only in the case of a sleeve designed according to the invention or an elastomer bearing designed according to the invention, by virtue of the fact that the outer sleeve part is additionally provided on its outer peripheral surface with a bonding-agent layer and an elastomer layer lying over this bonding-agent layer. This results in a dull outer surface which brings about a high coefficient of friction with the associated receiver, which has an advantageous effect on the pressing-out behavior.

DESCRIPTION OF THE DRAWINGS

Further advantageous embodiments of the invention are contained in the subclaims and the special description below. The invention is explained in greater detail with reference to a number of illustrative embodiments shown in the accompanying drawing, in which:

FIGS. 1a and 1b show a front view and a side view of an embodiment of an outer sleeve part of an outer sleeve assembly according to the invention;

FIGS. 2a and 2b show a front view and a side view of an embodiment of an inner sleeve part of an outer sleeve assembly according to the invention;

FIG. 3b shows a partial front view in a slit-free region of an embodiment of a sleeve according to the invention but on enlarged scale in relation to FIG. 3a;

FIGS. 4a to 4c show a front view, a top view and a section of an embodiment of an elastomer bearing according to the invention, FIG. 4a illustrating the front view, FIG. 4b the top view and FIG. 4c a section along the line in FIG. 4b;

FIGS. 5a to 5d show typical loading cases to which an elastomer bearing according to the invention is subjected during its use, and FIG. 6 shows in partial section a further embodiment of an outer sleeve part of a sleeve according to the invention.

DETAILED DESCRIPTION OF THE INVENTION

Figure 3A:
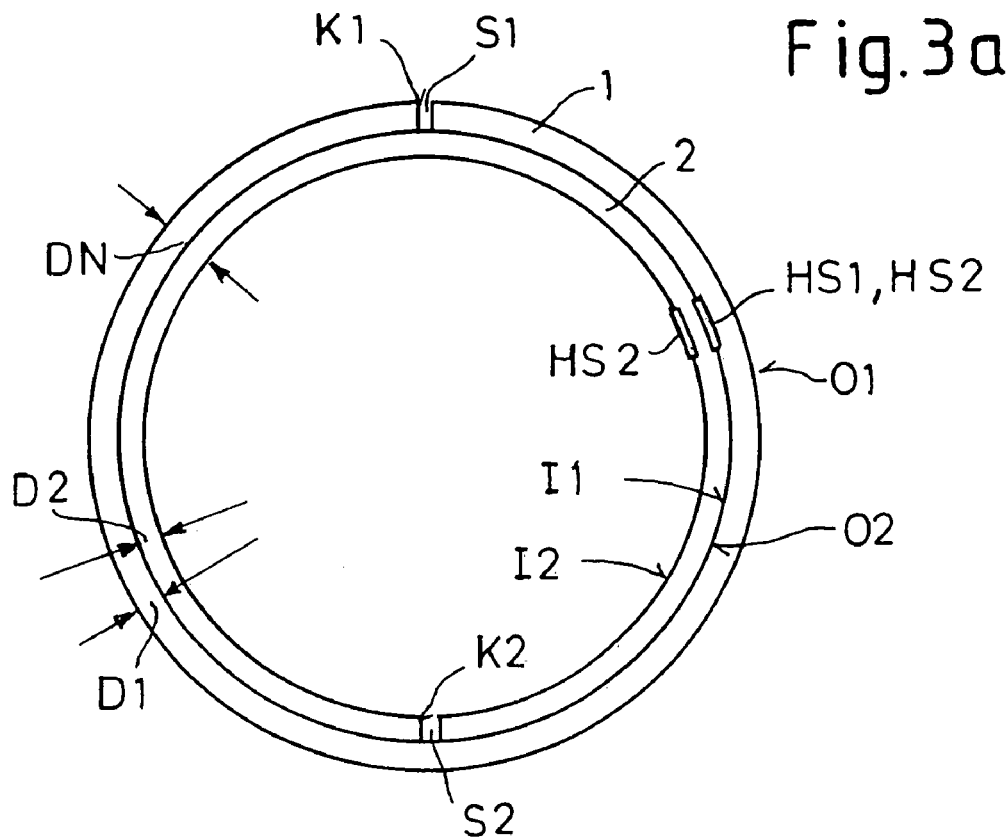
FIG. 3a shows a front view of an embodiment of a sleeve according to the invention.

Throughout this description the same elements are always provided with the same references in the various figures of the drawing, so that they are also as a rule described only once in each case.

As shown by FIGS. 1a, 1b and 2a, 2b, an outer sleeve assembly according to the invention comprises two annular sleeve parts, an outer sleeve part 1 illustrated in FIGS. 1a, 1b and an inner sleeve part 2 illustrated in FIGS. 2a, 2b. The outer sleeve part 1 and/or the inner sleeve part 2 can preferably, in a technologically advantageous embodiment, in each case be bent punchings consisting of a metal sheet.

The sleeve parts 1, 2 each form a slit S1, S2 and have a height H1, H2, a thickness D1, D2 and an outside diameter DA1, DA2. Edges K1, K2, which delimit the slits S1, S2 in the outer sleeve part 1 and in the inner sleeve part 2, are rectilinear (i.e. cut along a straight line parallel to the longitudinal axis of the bearing).

The outer sleeve part 1 is, on its inner peripheral surface I1, and the inner sleeve part 2 is, on its inner peripheral surface I2 and on its outer peripheral surface O2, provided in each case with a bonding-agent layer (HS1 for the first sleeve part 1, S2 for the second sleeve part).

The sleeve according to the invention with its two sleeve parts 1, 2 is intended in particular for forming an outer sleeve AHÜ for an elastomer bearing 3 according to the invention, which is illustrated in FIGS. 4a, 4b and 4c.

Figure 3B:
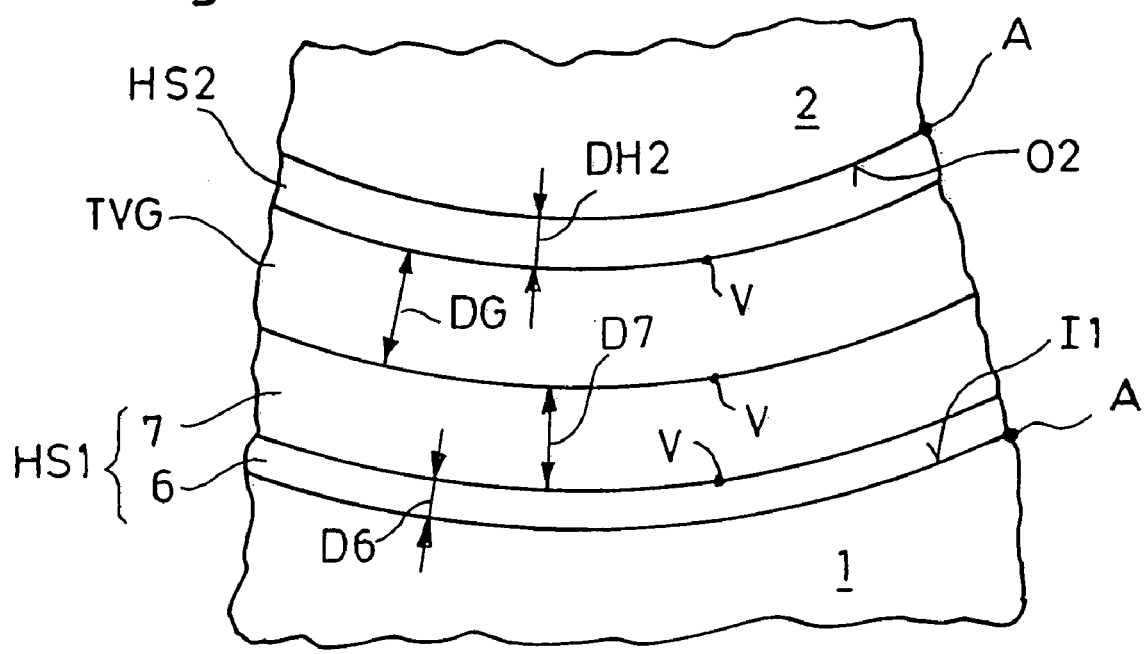

In the outer sleeve AHÜ, as is also shown by the illustrations of the sleeve according to the invention in FIGS. 3a and 3b, the two annular sleeve parts 1, 2 are arranged coaxially with one another. In particular, to form the sleeve AHÜ, the outer sleeve part 1 is to begin with pushed onto the inner sleeve part 2 with a press fit. The slits S1, S2 in the outer sleeve part 1 and in the inner sleeve part are staggered in relation to one another by 180°. A nominal thickness DN of the sleeve can then, as illustrated by FIG. 3a and FIG. 4a, preferably result from the sum of the thicknesses D1, D2 of the outer sleeve part 1 and of the inner sleeve part 2.

The enlarged detail in FIG. 3b shows how the bonding-agent layers HS1, HS2, of the outer sleeve part 1 on its inner peripheral surface I1 and of the inner sleeve part 2 on its outer peripheral surface O2, which are indicated only diagrammatically in FIGS. 1a to 3a, can be constructed in detail.

In this connection, the bonding-agent layer HS1 on the inner peripheral surface I1 of the outer sleeve part 1 is a double layer which consists of a primer layer 6 based on phenolic resin, which is deposited directly on the inner peripheral surface I1 and can preferably have a dry film layer thickness D6 of 1 to 2 μm, and of a rubber bonding-agent layer 7, lying over the primer layer 6, for NR, NBR, HNBR etc., for example, which can preferably have a dry film layer thickness D7 of 3 to 9 μm.

The bonding-agent layer HS2 on the outer peripheral surface O2 of the inner sleeve part 2 is a single rubber bonding-agent layer which can preferably have a dry film layer thickness DH2 of 1 to 2 μm.

In addition to the bonding-agent layers HS1, HS2, a partially crosslinked rubber layer TVG with the thickness DG is provided between these layers. The thickness can then preferably lie in a range from roughly 5 to 15 μm.

The adhesion forces, indicated diagrammatically in FIG. 3b by the arrows A, on the peripheral surfaces I1, O2 of the sleeve parts 1, 2 and the bonding forces, indicated by the double arrows with the reference V, arising in the boundary layers between the rubber layer TVG and the bonding-agent layers HS1, HS2 by virtue of the incomplete crosslinking can bring about material bonding between the sleeve parts 1, 2 in addition to the press fit already mentioned.

In addition to the outer sleeve AHÜ, the elastomer bearing 3 according to the invention preferably is used with an inner sleeve IHÜ, in the form of a core provided with a bore B, which is connected adherently to the outer sleeve AHÜ by a vulcanized elastomer layer 4.

As in particular FIG. 2b and FIG. 4c illustrate, the inner sleeve part 2 comprises openings, in particular two slots L2, for passage of a free-flowing elastomer mixture which is intended to form the vulcanized elastomer layer.

To produce the elastomer bearing 3 according to the invention, the elastomer mixture, in particular rubber, such as natural rubber for example, is injected in highly liquid state into the space enclosed by the inner sleeve part 2 at elevated temperature and under high pressure. The elastomer mixture then passes, in particular via the slots L2 but also via the slit S2 of the inner sleeve part 2, between the surfaces facing one another of the sleeve parts 1, 2, that is between the inner peripheral surface I1 of the outer sleeve part 1 and the outer peripheral surface O2 of the inner sleeve part 2. The elastomer mixture is prevented from penetrating in the region of the slit S1 of the outer sleeve part 1 by the slit stagger mentioned.

By the end of the vulcanization of the elastomer mixture, the sleeve parts 1, 2 are bonded to one another adherently by a material connection, in particular via the elastomer which is located between the surfaces facing one another of the sleeve parts 1, 2 and has penetrated from the elastomer layer 4 and also via the bonding-agent layers HS1, HS2 located on the surfaces I1, O2.

If a partially crosslinked rubber layer TVG is present between the bonding-agent layers HS1, HS2, this rubber layer TVG can both vulcanize completely during the vulcanization described and become connected to the elastomer which has penetrated from the elastomer layer 4. By virtue of this, a uniformly firm interconnection of the sleeve parts 1, 2 is advantageously achieved over the whole surface, that is over the entire peripheral surfaces I1, O2, even where elastomer may perhaps not penetrate to from the elastomer layer 4. This is of importance particularly where forces which exert a shear effect on the connection of the sleeve parts 1, 2 arise under the operating conditions of the elastomer bearing 3 according to the invention, for example in the case of use in a vehicle.

A further possible construction for the bonding-agent layers HS1, HS2 is also described by way of example for the outer sleeve part 1 with reference to FIG. 6.

Associated with the reduced production outlay according to the invention in relation to conventional elastomer bearings is high functionality which is expressed in high loadability when the typical loading cases illustrated in FIGS. 5a to 5d, to which an elastomer bearing 3 according to the invention is subjected during its use, are present. In this connection, FIG. 5a also illustrates a receiver 5, in which the bearing is fastened with a force fit or press fit. The elastomer bearing 3 according to the invention is suitable for both damping axial forces Fa (FIG. 5a) and radial forces Fr (FIG. 5b) and corresponding movements and taking up movements which have a twisting effect, illustrated by the torsion angle c in FIG. 5c, and cardioiddeflections, illustrated by the deflection angle δ in FIG. 5d.

In this connection, the loading case illustrated in FIG. 5a also corresponds essentially to that which is to be taken as a basis for checking that the fit of elastomer bearings 3 according to the invention in their receivers 5 is of appropriate quality.

The interconnection of the sleeve parts 1, 2 in a sleeve according to the invention is highly stable and guarantees high pressing-out forces for an elastomer bearing 3 according to the invention. To increase the pressing-out forces, however, further, additional measures can also advantageously be provided. It is thus possible for the said purpose for knurling to be impressed on the outer peripheral surface O1 of the outer sleeve part 1.

A further advantageous possibility in this respect is illustrated in detail by FIG. 6. In this case, the drawing shows an outer sleeve part 1 which, in contrast to the embodiment described above, can also be the sole sleeve part of an outer sleeve AHÜ. The sleeve part 1 can be made from a metal strip of any kind.

The sleeve part 1 is coated with a bonding-agent layer HS1 in each case on the inner peripheral surface I1 and on the outer peripheral surface O1.

In this connection, the bonding-agent layer HS1 on the inner peripheral surface I1 is a double layer which consists of a primer layer 6 based on phenolic resin, which is deposited directly on the inner peripheral surface I1 and can preferably have a dry film layer thickness D6 of 1 to 3 μm, and of a rubber bonding-agent layer 7, lying over the primer layer 6, for NR, NBR, HNBR etc., for example, which can preferably have a dry film layer thickness D7 of 10 to 30 μm.

The bonding-agent layer HS1 on the outer peripheral surface O1 is a single layer which can consist of a primer layer 6 based on phenolic resin, as is also a component of the double layer.

On the outer peripheral surface O1 of the sleeve part 1, an elastomer layer 8, which can be a fully crosslinked rubber layer, for example, consisting in particular of NBR, with a preferred Shore A hardness of 70, lies over the bonding-agent layer HS1. The elastomer layer 8 results in a surface of the sleeve part 1 which brings about a high coefficient of friction in a receiver 5, which, as already mentioned, has an advantageous effect on the pressing-out behavior.

For protection during transport or during machining of the sleeve part 1, the elastomer layer can optionally be covered with a protective film 9, as shown in FIG. 6.

The invention is not limited to the illustrative embodiments above. It is thus also possible, for example, to use other systems instead of the bonding agents described in the bonding-agent layer HS1 and HS2 without leaving the scope of the invention. The angular stagger of the slit S1 in the outer sleeve part 1 in relation to the slit S2 in the inner sleeve part 2 can preferably be 90°, 180° or 270° but may also have other values. The material connection between the inner peripheral surface I1 of the outer sleeve part 1 and the outer peripheral surface O2 of the inner sleeve part 2 can be designed over the whole surface or only on one or more part areas of the peripheral surfaces I1, O2.

Moreover, numerous further design possibilities of the invention exist, for example in the use of primers which are generally known or novel primers as a component of the first layer of the bonding-agent system designed as a double layer, for example, according to the invention or in the design of the recipe of the elastomers enclosed by the outer sleeve AHÜ or applied to the outer surface O1 of the outer sleeve AHÜ.

While the above description constitutes the preferred embodiment of the present invention, it will be appreciated that the invention is susceptible to modification, variation, and change without departing from the proper scope and fair meaning of the accompanying claims.

The invention claimed is:

1. A sleeve assembly that receives an inner core and an elastomeric layer between the sleeve assembly and the inner core to form an elastomeric bearing, the sleeve assembly comprising:
   an annular outer sleeve part forming an outer sleeve slit;
   an inner sleeve part forming an inner sleeve slit;
   a first bonding-agent layer in contact with the inner peripheral surface of the outer sleeve part; and
   a second bonding-agent layer in contact with the outer peripheral surface of the inner sleeve part;
   wherein the outer sleeve part is arranged coaxially to the inner sleeve part with the slits of the sleeve parts being staggered in relation to one another;
   wherein at least one of the first and second bonding-agent layers is a double layer comprised of a directly deposited primer layer and a rubber bonding-agent layer lying over the primer layer.

2. A sleeve assembly according to claim 1 wherein the primer layer has a dry film layer thickness in the range from 1 to 3 μm.

3. A sleeve assembly according to claim 1 wherein the rubber bonding-agent layer lying over the primer layer has a dry film layer thickness in the range from 3 to 30 μm.

4. A sleeve assembly according to claim 1 wherein a material connection is provided between the inner peripheral surface of the outer sleeve part and the outer peripheral surface of the inner sleeve part over at least a portion of the peripheral surfaces.

5. A sleeve assembly according to claim 1 wherein the outer sleeve part is connected to the inner sleeve part via a rubber layer which is initially only partially vulcanized.

6. A sleeve assembly according to claim 1 wherein the slits in at least one of the outer sleeve part and the inner sleeve part are delimited by edges of rectilinear design.

7. A sleeve assembly according to claim 1 wherein the slits in the outer sleeve part and in the inner sleeve part are staggered in relation to one another by about 90°, 180°, or 270°.

8. A sleeve assembly according to claim 1 wherein the outer sleeve part is pushed onto the inner sleeve part with a press fit.

9. A sleeve assembly according to claim 1 wherein at least one of the outer sleeve part or inner sleeve part is formed of a bent stamping comprising of metal sheet.

10. A sleeve assembly according to claim 1 wherein the inner sleeve part forms at least one opening, extending through the periphery thereof for passage of a free-flowing elastomer mixture forming the elastomer layer between the sleeve assembly and the inner core.

11. A sleeve assembly according to claim 1 wherein the directly deposited primer layer of the double layer is based on phenolic resin.

12. An elastomeric bearing consisting of:
an outer sleeve assembly;
an inner core; and
an elastomer layer between the outer sleeve assembly and the inner core;
wherein the outer sleeve assembly comprises an annular outer sleeve part forming an outer sleeve slit and is arranged coaxially with an inner sleeve part, which forms an inner sleeve slit, the outer sleeve part, on its inner peripheral surface, and the inner sleeve part on its outer peripheral surface, each having a bonding-agent layer, and the slits of the sleeve parts being staggered in relation to one another.

13. An elastomeric bearing according to claim 12 wherein the outer sleeve part and the inner sleeve part of the sleeve assembly are interconnected adherently by a material connection, in the form of a vulcanized elastomer which is arranged between the inner peripheral surface of the outer sleeve part and the outer peripheral surface of the inner sleeve part, and also via their respective bonding-agent layers.

14. An elastomeric bearing according to claim 13 wherein the vulcanized elastomer originates from the elastomer layer between the outer sleeve assembly and the inner core.

15. An elastomeric bearing according to claim 12 wherein a knurling is impressed on the outer peripheral surface of the outer sleeve part.

16. An elastomeric bearing according to claim 12 wherein the inner core is provided with a bore forming an inner sleeve.

* * * * *